United States Patent
Giazzon (10) Patent No.: US 11,402,874 B1
(45) Date of Patent: *Aug. 2, 2022

(54) PROTECTIVE COVER FOR A LAPTOP COMPUTER

(71) Applicant: MAX Interactive, Inc., Costa Mesa, CA (US)

(72) Inventor: Albert George Giazzon, San Clemente, CA (US)

(73) Assignee: MAX Interactive, Inc., Irvine, CA (US)

(*) Notice: Subject to any disclaimer, the term of this patent is extended or adjusted under 35 U.S.C. 154(b) by 585 days.

This patent is subject to a terminal disclaimer.

(21) Appl. No.: 16/523,289

(22) Filed: Jul. 26, 2019

Related U.S. Application Data (60) Provisional application No. 62/850,272, filed on May 20, 2019.

(51) Int. Cl.
   *G06F 1/16* (2006.01)
   *A45C 11/00* (2006.01)

(52) U.S. Cl.
   CPC ............ *G06F 1/1656* (2013.01); *A45C 11/00* (2013.01); *A45C 2011/003* (2013.01)

(58) Field of Classification Search
   CPC ... A45C 11/00; A45C 2011/003; B65D 85/30; G06F 1/16; G06F 1/1616; G06F 1/1656; G06F 2200/1633
   USPC ...................................... 206/320; 361/679.01
   See application file for complete search history.

(56) References Cited

U.S. PATENT DOCUMENTS

| 6,109,434 | A | 8/2000 | Howard, Jr. |
| 7,672,117 | B1 | 3/2010 | Gary et al. |
| 8,613,992 | B2 | 12/2013 | Hsu |
| 9,380,854 | B2 | 7/2016 | Hamra |
| 9,778,702 | B2 | 10/2017 | Song et al. |
| 10,216,222 | B2 | 2/2019 | Fenton et al. |
| 10,234,898 | B2 | 3/2019 | Bekele |
| 10,585,450 | B1 * | 3/2020 | Giazzon ................. G06F 1/1616 |
| 10,990,134 | B2 * | 4/2021 | Ho ......................... G06F 1/1616 |
| 2005/0187784 | A1 | 8/2005 | Bander et al. |
| 2006/0042996 | A1 | 3/2006 | Picot et al. |
| 2006/0226040 | A1 | 10/2006 | Medina |
| 2008/0308437 | A1 | 12/2008 | Lin |

(Continued)

FOREIGN PATENT DOCUMENTS

WO    WO2013069005    5/2013

*Primary Examiner* — Bryon P Gehman
(74) *Attorney, Agent, or Firm* — Eric Karich; Karich & Associates (57) ABSTRACT

A protective cover for a laptop computer having a screen portion and a keyboard portion has a top cover and a bottom cover which are not connected to each other. The top cover has a main body that extends to an outer perimeter, which includes a downwardly extending wall that extends downwardly from the outer perimeter. A plurality of tabs extends inwardly from the downwardly extending wall of the top cover adjacent the outer perimeter, adapted for attaching the top cover to the screen portion of the laptop computer. The bottom cover has a front panel that extends laterally to corners, from which extend a pair of longitudinally extending elongate arms. An adhesive element is disposed on the front panel and on each of the longitudinally extending elongate arms, adapted for permanently bonding the bottom cover to the keyboard portion of the laptop computer.

18 Claims, 6 Drawing Sheets

(56) References Cited

U.S. PATENT DOCUMENTS

2010/0110629 A1 5/2010 Dietz et al.
2014/0063784 A1 3/2014 Muiter
2017/0112249 A1 4/2017 Peterson
2019/0086953 A1 3/2019 Chavennes

* cited by examiner

PROTECTIVE COVER FOR A LAPTOP COMPUTER

CROSS-REFERENCE TO RELATED APPLICATIONS

This application for a utility patent claims the benefit of U.S. Provisional Application No. 62/850,272, filed May 20, 2019.

BACKGROUND OF THE INVENTION

Field of the Invention

This invention relates generally to protective covers, and more particularly to a protective cover for use with a laptop computer.

Description of Related Art

The prior art teaches many forms of covers for computers and computer components.

Chavannes, U.S. 2019/0086953, for example, teaches a single protective cover for protecting the screen of a portable computer, the cover having a plastic central core and an aluminum outer shell. Four adhesive strips are applied to the outer shell so that its width is parallel to the pair of opposed major edges. The adhesive strip is spaced from one of the opposed major edges by approximately one-half the adhesive strip's height and is spaced from one of the opposed minor edges by a distance of approximately the adhesive strip's height.

Picot, U.S. 2006/0042996, teaches a protective cover for a laptop intended to be directly or indirectly separately mounted on the upper surface or screen and lower surface or base of the latter, respectively. The covers are attached via an adhesive or Velcro, in a manner that allows relative movement.

Hsu, U.S. Pat. No. 8,613,992, teaches a protective cover of an electronic device that includes a leather protective cover, which includes an outside surface and a bottom surface. An adhesive construction is attached to the bottom surface of the leather layer. The adhesive construction includes a lower adhesive layer (acrylic, rubber, or silicone based adhesive) for strongly bonding a middle substrate (non-woven fabric, PET, about 0.05-0.1 mm thick) to the leather layer. A weaker upper adhesive layer is provided for bonding the cover to the electronic device, bonding between 0.5-1.0 Kg/square inch, so that the protective cover may be readily attached and detached from the electronic device.

The present invention better fulfills the needs of the marketplace and provides further advantages as described in the following summary.

SUMMARY OF THE INVENTION

The present invention teaches certain benefits in construction and use which give rise to the objectives described below.

The present invention provides a protective cover for a laptop computer having a screen portion and a keyboard portion. The protective cover comprises a top cover and a bottom cover which are not connected to each other, the top cover having a main body that extends to an outer perimeter. The outer perimeter includes a downwardly extending wall which extends downwardly from the outer perimeter. A plurality of tabs extends inwardly from the downwardly extending wall of the top cover adjacent the outer perimeter, adapted for attaching the top cover to the screen portion of the laptop computer. The bottom cover has a front panel that extends laterally to corners, from which extend a pair of longitudinally extending elongate arms. An adhesive element is disposed on the front panel and on each of the longitudinally extending elongate arms, adapted for permanently bonding the bottom cover to the keyboard portion of the laptop computer.

A primary objective of the present invention is to provide a protective cover for a laptop computer having advantages not taught by the prior art.

Another objective is to provide a protective cover which can be attached to a laptop computer via a combination of adhesives and tabs.

A further objective is to provide a protective cover having a top cover and a bottom cover which are not connected.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a protective cover 10 for a laptop computer 12.

Figure 1:
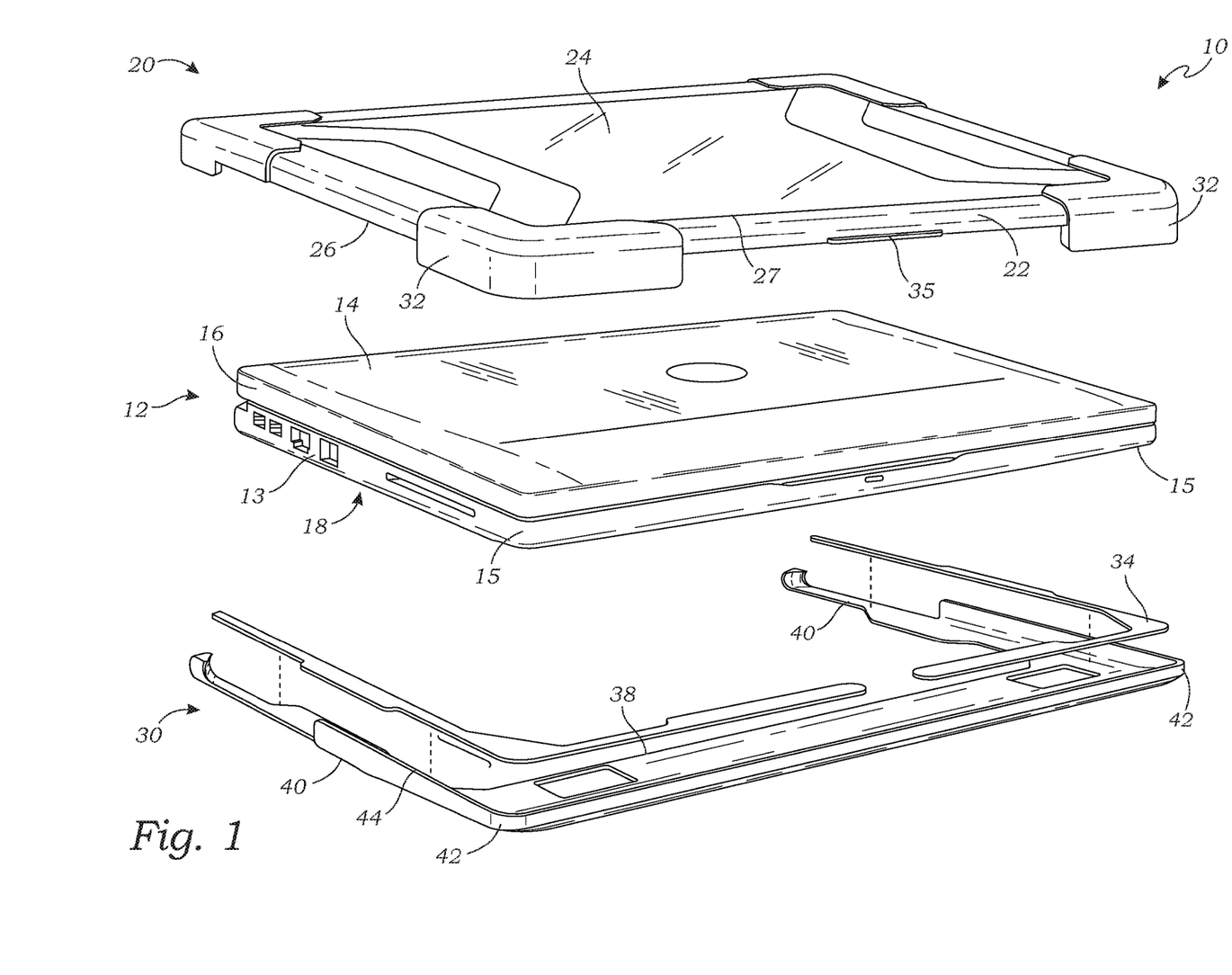
FIG. 1 is an exploded top perspective view of an external protective cover for a laptop computer according to one embodiment of the present invention.
Figure 2:
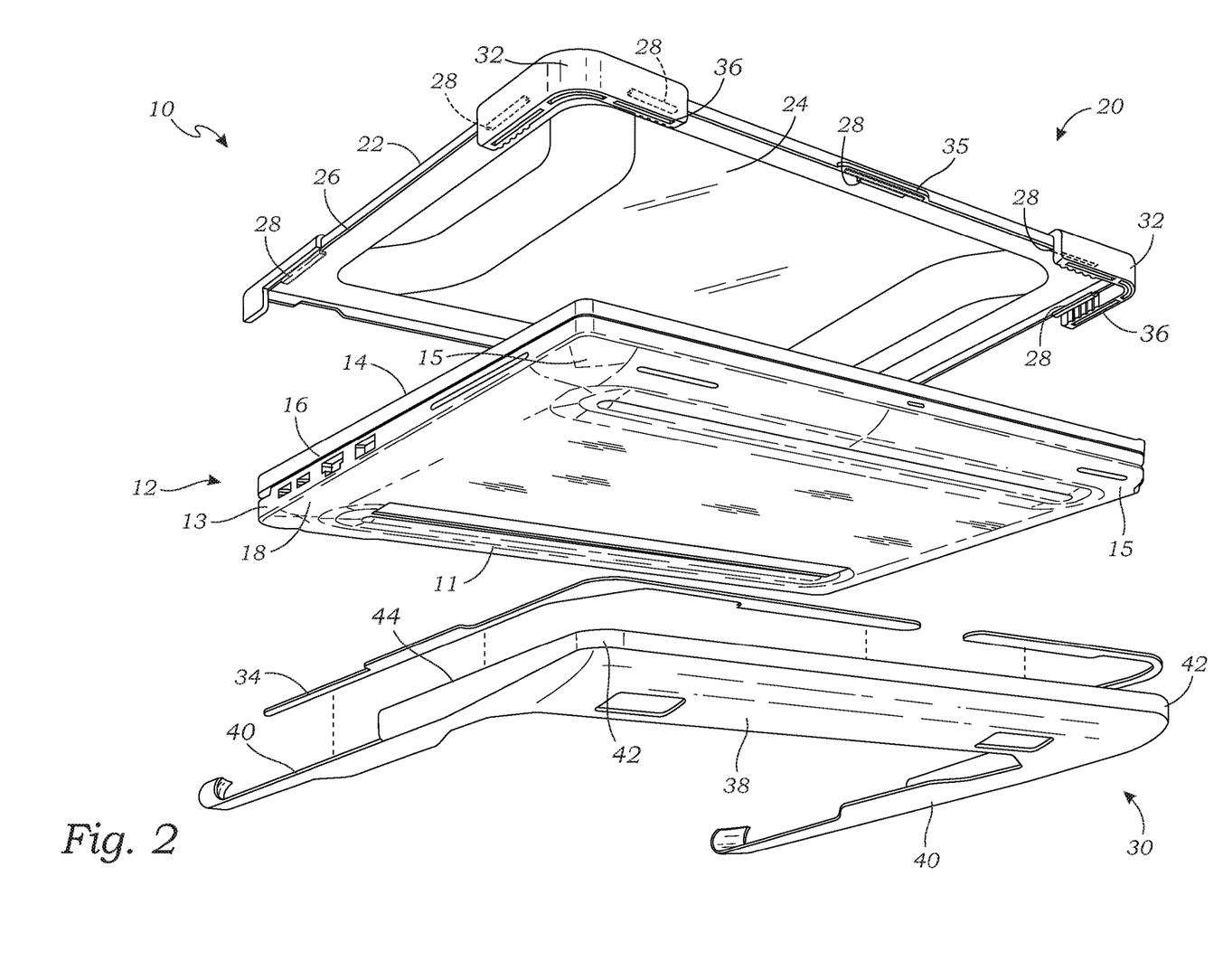
FIG. 2 is an exploded bottom perspective view thereof.

FIG. 1 is an exploded top perspective view of one embodiment of the protective cover 10, and FIG. 2 is an exploded bottom perspective view of the protective cover 10. As shown in FIGS. 1-2, a top cover 20 of the protective cover 10 is secured to the laptop computer 12 via a plurality of tabs 28, while a bottom cover 30 is secured via an adhesive element 34, as described in greater detail below. This unique combination provides particular benefits that are greatly needed in the marketplace.

As shown in FIGS. 1-2, the top cover 20 is adapted to be mounted on a screen portion 14 of a laptop 12. As discussed in greater detail below, the top cover 20 is mounted to an outer edge 16 of the screen portion 14 via the plurality of tabs 28, described in greater detail below. The bottom cover 30 is permanently mounted to an outer edge 13 of a keyboard portion 18 of the laptop 12 via the adhesive element 34, also described in greater detail below.

In the embodiment of FIGS. 1-2, the top cover 20 and the bottom cover 30 are constructed as two separate components, and are not attached via a hinge or other connection.

The top cover 20 and the bottom cover 30 may be manufactured and sold as single product set, or alternatively sold individually.

Figure 3:
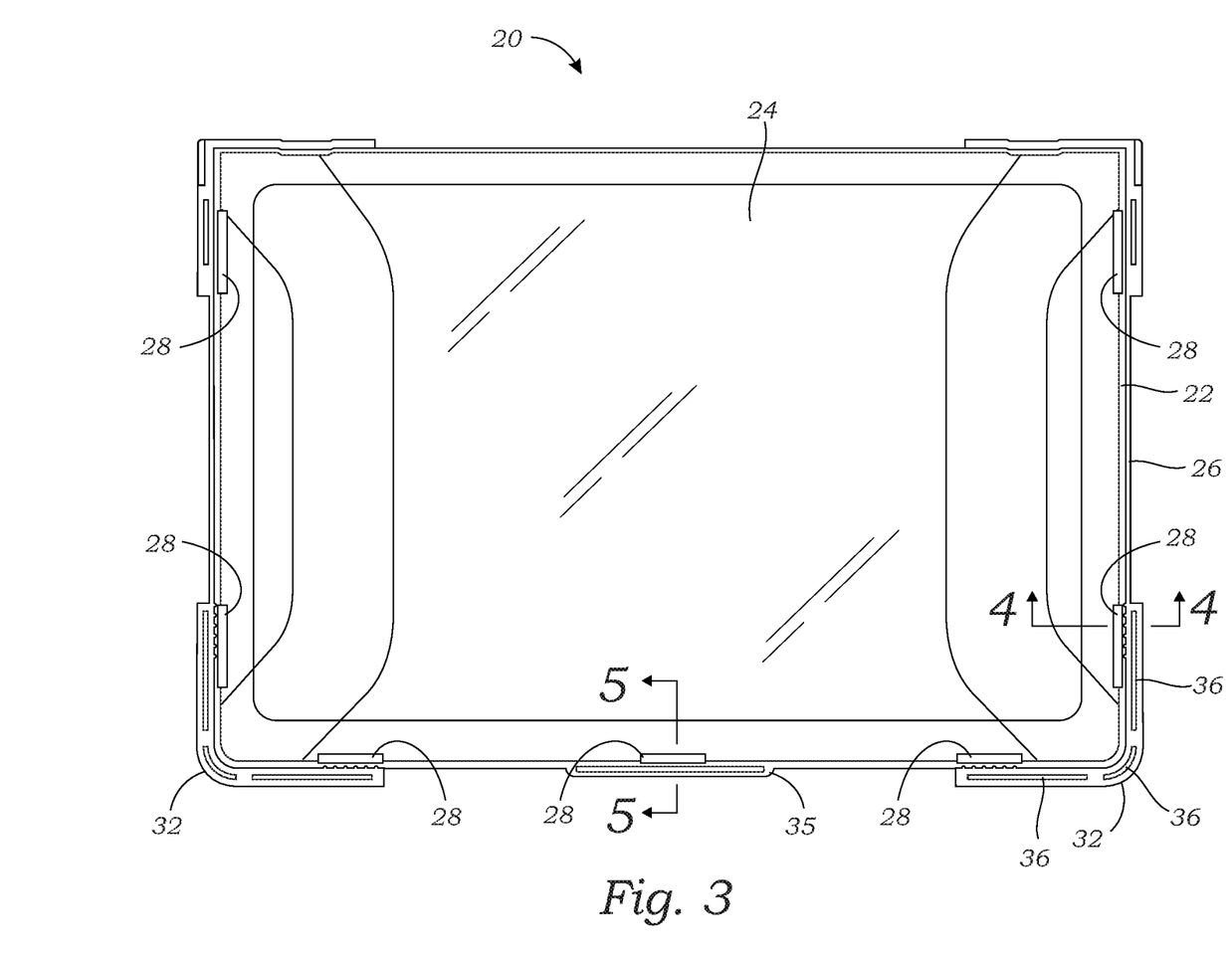
FIG. 3 is a bottom plan view of a top cover, showing a plurality of tabs.

FIG. 3 is a bottom plan view of the top cover 20. As shown in FIGS. 1-3, the top cover 20 includes a main body 24 that extends to an outer perimeter 22. The outer perimeter 22 includes a downwardly extending wall 26 which extends downwardly from the outer perimeter 22. In this embodiment, the outer perimeter 22 has a perimeter covering 27 that covers at least a portion of the main body 24 and the downwardly extending wall 26. The perimeter covering 27 may be formed of a resilient material such as thermoplastic polyurethane (TPU), thermoplastic elastomer, or other suitable resilient material (e.g., silicone, soft plastic, rubber, etc.), while the main body 24 is constructed of a rigid material such as polycarbonate. The main body 24 may be integrally formed with the tabs 28, such that the tabs 28 are of the same rigid material. In this embodiment, the outer perimeter 22 is co-molded with the main body 24. In one embodiment, the main body 24, the downwardly extending wall 26, and the tabs 28 are constructed of acrylic.

As shown in the figures, the protective cover 10 may further include resilient corners 32, to further protect the laptop 12 in case of a fall. In this embodiment, the corners 32 project outwardly and downwardly far enough to provide protection to the laptop computer 12 without the use of the bottom cover 30. For example, many new laptops are designed to survive a drop from roughly the height of a desk, and have further added features such as rubber bumpers, reinforced ports and hinges, and mechanically anchored keys. The top cover 20 complements this modern laptop design, by providing the front corners 32 which are thicker than the rest of the outer perimeter 22 and have a set of clefts 36 on the inner edge of the corners 32, thereby providing further protection to corners 15 of the laptop 12. The front corners 32 may be constructed of a similar material to the perimeter covering 27, as described above.

The downwardly extending wall 26 is shaped and adapted to correspond with the outer edges 16 and 13 of the laptop 12, and may include portions which are lower, so that a user may access portions of the laptop 12 such as a power connection, media drive, etc., while the protective cover 10 is installed.

As shown in FIGS. 2-3, the main body 24 includes the plurality of tabs 28 which extend inwardly from the downwardly extending wall 26, adjacent the outer perimeter 22. The tabs 28 are spaced a distance apart, such that any supported weight is distributed across the tabs 28. In this embodiment, there are six tabs 28 extending from the wall 26, but in other embodiments, there may be a greater or fewer number of tabs spaced in any desired combination, as deemed suitable by those skilled in the art. While this configuration has provided excellent results, alternative configurations may also be used by one skilled in the art, and such alternative configurations should be considered within the scope of the present invention.

Figure 4:
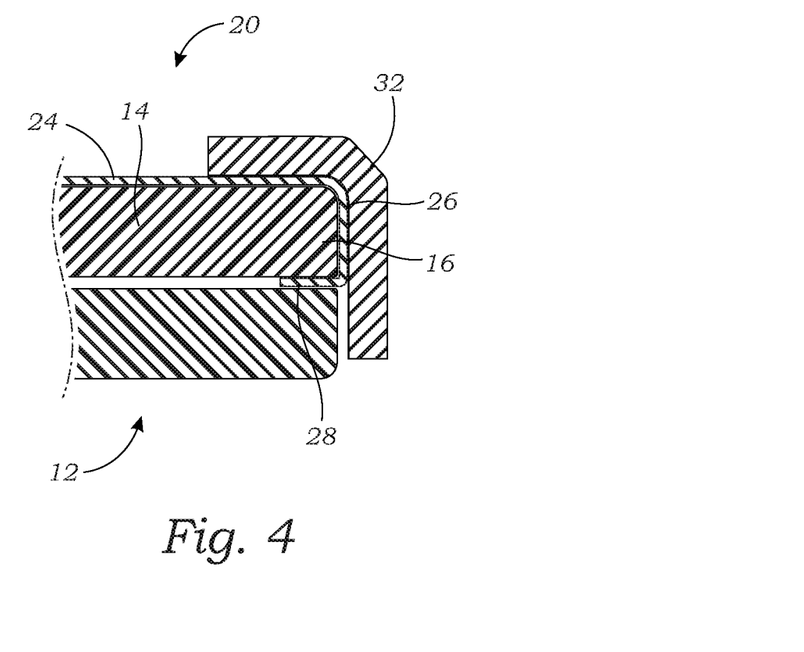
FIG. 4 is a sectional view of a front corner of the top cover, taken along line 4-4 in FIG. 3, illustrating the top cover mounted on the laptop.

FIG. 4 is a sectional view of the front corner 32 of the top cover 20 fitted onto the laptop 12. As shown in FIG. 4, the main body 24 of the top cover 20 is adapted to fit over the screen portion 14 of the of the laptop 12, the downwardly extending wall 26 is adapted to fit over the side edge 16 of the screen portion 14, and the tabs 28 are adapted to fit beneath the screen portion 14 of the laptop 12, thereby frictionally engaging the top cover 20 with the laptop 12.

Figure 5:
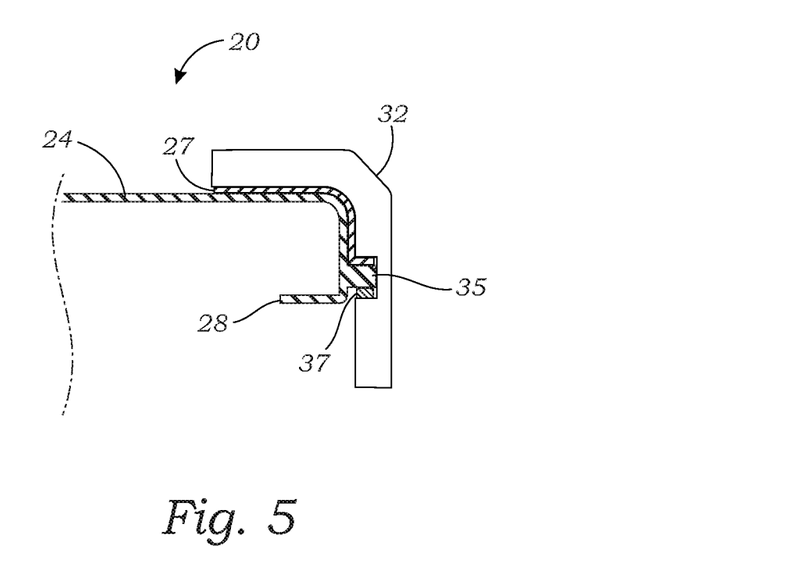
FIG. 5 is a sectional view of an outer perimeter of the top cover, taken along line 5-5 in FIG. 3.

FIG. 5 is a sectional view of the outer perimeter 22 of the top cover 20, taken along line 5-5 in FIG. 3. In this embodiment, a projection in the material of the downwardly extending wall 26 may form a ledge 35. The ledge 35 may include a rubber pad 37, and the perimeter covering 27 may extend outwardly onto the ledge 35. When the top cover 20 is securely attached to the laptop 12, a user may lift the ledge 35 to assist in opening the laptop 12. As shown in FIG. 5, the main body 24 is integrally formed with the downwardly extending wall 26, the ledge 35, and the tab, all being of a rigid material (as described above).

Figure 6:
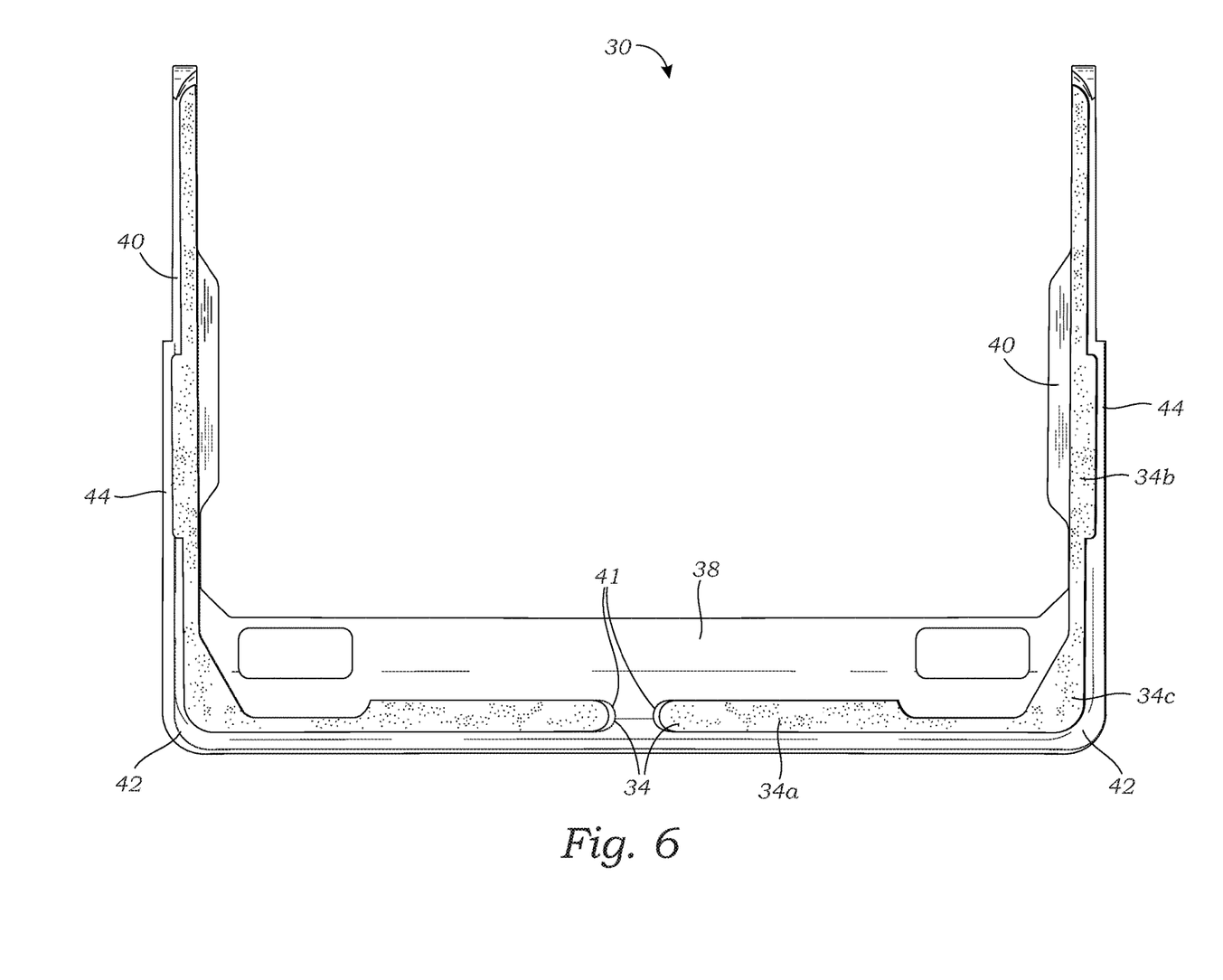
FIG. 6 is a top plan view of a bottom cover.

FIG. 6 is a top plan view of the bottom cover 30. In the embodiment of FIGS. 1-2 and 6, the bottom cover 30 has a front panel 38 that extends laterally to corners 42, from which extend a pair of longitudinally extending elongate arms 40. The bottom cover 30 has the adhesive element 34 disposed on the front panel 38 and on each of the longitudinally extending elongate arms 40, adapted for permanently bonding the bottom cover 30 to the keyboard portion 18 of the laptop 12.

The front panel 38 and the elongate arms 40 may further include an upwardly extending wall 44 for gripping the laptop 12. The upwardly extending wall 44 may include portions which are lower, so that a user may access portions of the laptop 12 such as a power connection, media drive, etc., while the protective cover 10 is installed. In this embodiment, the bottom cover 30 leaves a rear section 11 of the keyboard portion 18 open, but in other embodiments, the bottom cover 30 may form a generally rectangular frame, as shown in FIG. 7 and described below.

As shown in the embodiment of FIG. 6, the adhesive element 34 may be in the form of adhesive strips, which may be cut and sized for placement on the front panel 38 where it meets the upwardly extending wall 44. In this embodiment, the adhesive element 34 includes a pair of separate pieces of adhesive tape that each include a lateral section 34a and a longitudinal section 34b that are connected at a corner 34c so that they form an angle of about 90 degrees. In other embodiments, the adhesive element 34 may be in the form of any number of strips, in any combination to cover the bottom cover 30, and may have portions that widen to secure the strips onto any portion of the bottom cover 30 that may beneficially receive the adhesive element 34.

Figure 7:
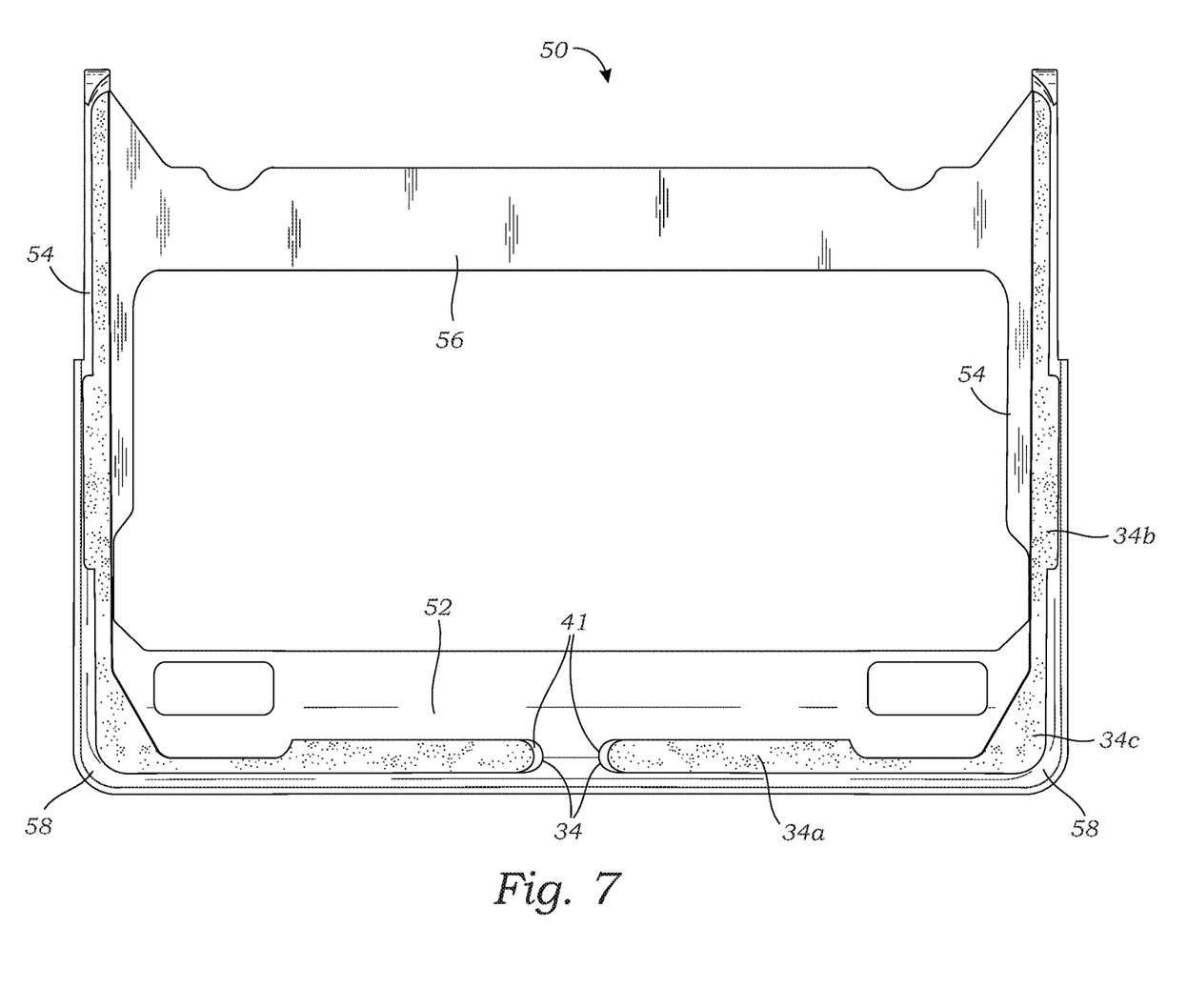
FIG. 7 is a top plan view of a second embodiment of the bottom cover.

FIG. 7 is a top plan view of a second embodiment of a bottom cover 50, having a similar structure to the embodiment of FIG. 6. In this embodiment, a front panel 52 having corners 58 which each extend into longitudinally extending elongate arms 54 which are joined together by a laterally extending rear edge 56, forming a generally rectangular frame adapted for installment on the outer edge 13 of the keyboard portion 18. Other components of the bottom cover 50 are identical to the bottom cover 30, and may be incorporated by reference.

In some embodiments, there may be channels 41 behind the upwardly extending wall 44 shaped to accept the adhesive element 34. However, in other embodiments, the strips may be cut and sized for placement on any surface of the protective cover 10, in any number of locations deemed suitable by those skilled in the art. In one embodiment, the strips may be die cut, to assist in manufacturing and attachment to the protective cover 10.

The combination of the tabs 28 of the top cover 20 and the adhesive element 34 of the bottom cover 30 and/or 50 provides a durable attachment of the cover 10 to the laptop 12, capable of passing drop tests of a minimum of four feet, particularly on hard surfaces, and durable enough to withstand hitting the corner of the laptop 12, without detachment of the protective cover 10 from the laptop 12.

The adhesive element 34 may be adhesive tape having double-sided bonding to a broad range of surface energy substrates (e.g., metals, glass, plastics, etc.), and which can functionally replace mechanical fasteners (rivets, welds, screws, etc.) or liquid adhesives. Materials for the adhesive element 34 may include a variety of powerful adhesives known in the art, such as cyanoacrylates, structural acrylics, or any other suitable material known in the art. In this embodiment, a 3M™ VHB™ tape is used, such as a white or clear double coated acrylic foam tape with paper liner, a thick black double coated acrylic foam tape with PET liner, etc. Each 3M™ VHB™ tape has low surface energy adhesive, creates a permanent seal against water, moisture, etc., and allows the use with a wide range of different materials. Virtually invisible fastening keeps surfaces smooth, while pressure sensitive adhesive bonds on contact to provide immediate handling strength. While this tape is currently used, those skilled in the art may select other suitable adhesives known in the art, which can function as described in this application, or in an equivalent manner, and such alternatives should be considered within the scope of the present invention.

The prior art teaches many laptop cases that utilize weak adhesives so that the cases may be easily removed simply by peeling the case off, or pulling with sufficient force. In this embodiment, a stronger and more permanent bond is utilized, contrary to the teachings of the prior art. For purposes of this application, the term "permanent" is hereby defined to mean the protective cover 10 cannot be removed from the laptop 12 without physically damaging the tape, the protective cover 10, and/or the surface of the laptop 12 itself, or without the use of specialized tools (e.g., heating tools for melting the adhesives). Removal of the adhesive element 34 would only be done by a professional with proper experience and tools to accomplish the removal without damage, e.g., a laptop repair specialist (trained to remove commercial grade adhesives as part of the repair process).

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A protective cover for a laptop computer having a screen portion and a keyboard portion, the protective cover comprising:
    a top cover having a main body that extends to an outer perimeter, the outer perimeter including a downwardly extending wall which extends downwardly from the outer perimeter;
    a plurality of tabs extending inwardly from the downwardly extending wall of the top cover adjacent the outer perimeter adapted for attaching the top cover to the screen portion of the laptop computer;
    a bottom cover having a front panel that extends laterally to corners, from which extend a pair of longitudinally extending elongate arms;
    an adhesive element disposed on the front panel and on each of the longitudinally extending elongate arms, adapted for permanently bonding the bottom cover to the keyboard portion of the laptop computer; and
    wherein the top cover and the bottom cover are not connected to each other.

2. The protective cover of claim 1, wherein the plurality of tabs are integral with the downwardly extending wall.

3. The protective cover of claim 2, wherein the main body, the downwardly extending wall, and the plurality of tabs, are formed of a rigid material.

4. The protective cover of claim 3, wherein the main body, the downwardly extending wall, and the plurality of tabs, are formed of acrylic.

5. The protective cover of claim 1, further comprising a perimeter covering that covers at least a portion of the main body and the downwardly extending wall, the perimeter covering being formed of a resilient material.

6. The protective cover of claim 5, wherein the resilient material is formed over the main body via a co-molding process.

7. The protective cover of claim 6, wherein the resilient material is thermoplastic polyurethane or thermoplastic elastomer.

8. The protective cover of claim 1, wherein the adhesive element includes a pair of generally L-shaped strips.

9. The protective cover of claim 1, wherein the elongate arms of the bottom cover are joined together by a laterally extending rear edge, forming a generally rectangular frame.

10. The protective cover of claim 1, wherein the bottom cover includes channels behind the upwardly extending wall shaped to accept the adhesive element.

11. The protective cover of claim 1, wherein the top cover has shock absorbing front corners which project outwardly far enough to shield both the screen portion and the keyboard portion of the laptop computer.

12. A protective cover for a laptop computer comprising:
    a top cover having a main body that extends to an outer perimeter, the outer perimeter including a downwardly extending wall which extends downwardly from the outer perimeter;
    a plurality of tabs extending inwardly from the downwardly extending wall of the top cover adjacent the outer perimeter;
    a bottom cover having a front panel that extends laterally to corners, from which extend a pair of longitudinally extending elongate arms; and
    an adhesive element disposed on the front panel and on each of the longitudinally extending elongate arms.

13. The protective cover of claim 12, wherein the plurality of tabs are integral with the downwardly extending wall.

14. The protective cover of claim 13, wherein the main body, the downwardly extending wall, and the plurality of tabs, are formed of a rigid material.

15. The protective cover of claim 14, wherein the main body, the downwardly extending wall, and the plurality of tabs, are formed of acrylic.

16. The protective cover of claim 12, further comprising a perimeter covering that covers at least a portion of the main body and the downwardly extending wall, the perimeter covering being formed of a resilient material.

17. The protective cover of claim 16, wherein the resilient material is formed over the main body via a co-molding process.

18. A protective cover for a laptop computer having a screen portion and a keyboard portion, the protective cover comprising:

a top cover having a main body that extends to an outer perimeter, the outer perimeter including a downwardly extending wall which extends downwardly from the outer perimeter;

a plurality of tabs extending inwardly from the downwardly extending wall of the top cover adjacent the outer perimeter adapted for attaching the top cover to the screen portion of the laptop computer;

a bottom cover having a front panel that extends laterally to corners, from which extend a pair of longitudinally extending elongate arms;

an adhesive element disposed on the front panel and on each of the longitudinally extending elongate arms, adapted for permanently bonding the bottom cover to the keyboard portion of the laptop computer; and wherein the main body, the plurality of tabs, and the downwardly extending wall are all formed of acrylic, and further comprising a perimeter covering that covers at least a portion of the main body and the downwardly extending wall, the perimeter covering being formed of a resilient material, wherein the resilient material is formed over the main body via a co-molding process, and the resilient material is thermoplastic polyurethane or thermoplastic elastomer.

* * * * *